(12) United States Patent
Ichioka

(10) Patent No.: US 8,839,199 B2
(45) Date of Patent: Sep. 16, 2014

(54) PROGRAMMABLE CONTROLLER SYSTEM AND DEVELOPMENT SYSTEM

(75) Inventor: Yuji Ichioka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 286 days.

(21) Appl. No.: 13/519,521

(22) PCT Filed: Jan. 20, 2010

(86) PCT No.: PCT/JP2010/050612
§ 371 (c)(1),
(2), (4) Date: Jun. 27, 2012

(87) PCT Pub. No.: WO2011/089688
PCT Pub. Date: Jul. 28, 2011

(65) Prior Publication Data
US 2012/0290775 A1    Nov. 15, 2012

(51) Int. Cl.
*G06F 12/00* (2006.01)
*G05B 19/05* (2006.01)

(52) U.S. Cl.
CPC .................................. *G05B 19/056* (2013.01)
USPC ............. 717/127; 711/202; 700/15; 717/136; 717/145

(58) Field of Classification Search
USPC ............. 711/202; 700/15; 717/127, 136, 145
See application file for complete search history.

(56) References Cited

FOREIGN PATENT DOCUMENTS

| JP | 10-333719 A | 12/1998 |
| JP | 11-212607 A | 8/1999 |
| JP | 2004-258797 A | 9/2004 |
| JP | 2005-174042 A | 6/2005 |
| JP | 2008-198148 A | 8/2008 |
| JP | 2009-157533 A | 7/2009 |

OTHER PUBLICATIONS

Korean Office Action, (Notice of Preliminary Rejection), mailed Oct. 16, 2014, Application No. 10-2012-7016098.

*Primary Examiner* — Gurtej Bansal
(74) *Attorney, Agent, or Firm* — Sughrue Mion, PLLC; Richard C. Turner

(57) ABSTRACT

To make it possible to perform efficient program development, a development system includes a label managing unit configured to update, when an execution program D2 is regenerated, a label information table D3, which corresponds to the execution program D2, for generating execution screen data D5 and executes or does not execute, according to update content of the label information table D3, update of ID information associated with the label information table D3 and the regenerated execution program D2 and a drawing apparatus configured to associate, when execution screen data D5 is generated based on the label information table D3, ID information of a value same as the ID information, which is associated with the label information table D3 at a point when the execution screen data D5 is generated, with the generated execution screen data D5.

14 Claims, 11 Drawing Sheets

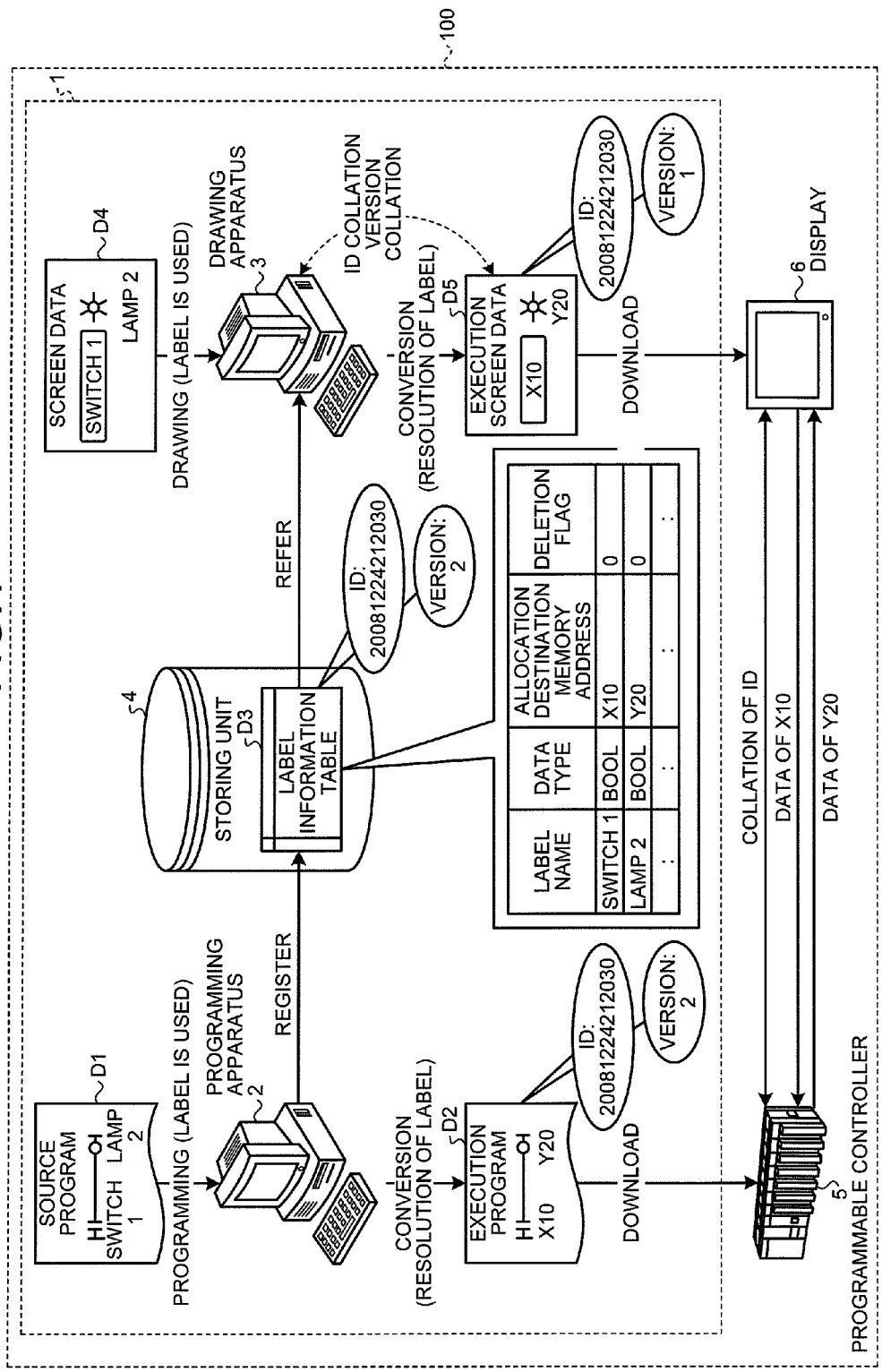

FIG.2

| No. | LABEL INFORMATION TABLE | MEASURES FOR OPERATION |
|---|---|---|
| 1 | ID INFORMATION: xxxx-xxx-001; VERSION: 1<br><br>| LABEL NAME | DATA TYPE | ALLOCATION DESTINATION MEMORY ADDRESS | DELETION FLAG |<br>|---|---|---|---|<br>| LAMP 1 | BOOL | Y10 | 0 |<br>| LAMP 2 | BOOL | Y11 | 0 |<br>| LAMP 3 | BOOL | T12 | 0 |<br>| SWITCH 1 | BOOL | X40 | 0 |<br>| SWITCH 2 | BOOL | X41 | 0 |<br>| SWITCH 3 | BOOL | X42 | 0 |<br>| SWITCH 4 | BOOL | X43 | 0 |<br>| TEMPERATURE 1 | INT | D100 | 0 |<br>| TEMPERATURE 2 | INT | D101 | 0 | | INITIAL STATE |
| 2 | ID INFORMATION: xxxx-xxx-001; VERSION: 2<br><br>| LABEL NAME | DATA TYPE | ALLOCATION DESTINATION MEMORY ADDRESS | DELETION FLAG | |<br>|---|---|---|---|---|<br>| LAMP 1 | BOOL | Y10 | 0 | |<br>| LAMP 2 | BOOL | Y11 | 0 | |<br>| LAMP 3 | BOOL | T12 | 0 | |<br>| SWITCH 1 | BOOL | X40 | 0 | |<br>| SWITCH 2 | BOOL | X41 | 0 | |<br>| SWITCH 3 | BOOL | X42 | 0 | |<br>| SWITCH 4 | BOOL | X43 | 0 | |<br>| SWITCH 10 | BOOL | X50 | 0 | (ADDED) |<br>| TEMPERATURE 1 | INT | D100 | 0 | |<br>| TEMPERATURE 2 | INT | D101 | 0 | |<br>| TEMPERATURE 1 | INT | D200 | 0 | (ADDED) | | ADD LABEL<br>・NOT CHANGE ID INFORMATION<br>・INCREMENT ONLY VERSION |
| 3 | ID INFORMATION: xxxx-xxx-001; VERSION: 3<br><br>| LABEL NAME | DATA TYPE | ALLOCATION DESTINATION MEMORY ADDRESS | DELETION FLAG | |<br>|---|---|---|---|---|<br>| LAMP 1 | BOOL | Y10 | 0 | |<br>| LAMP 2 | BOOL | Y11 | 0 | |<br>| LAMP 3 | BOOL | Y12 | 1 | (DELETED) |<br>| SWITCH 1 | BOOL | X40 | 0 | |<br>| SWITCH 2 | BOOL | X41 | 0 | |<br>| SWITCH 3 | BOOL | X42 | 0 | |<br>| SWITCH 4 | BOOL | X43 | 1 | (DELETED) |<br>| SWITCH 10 | BOOL | X50 | 0 | |<br>| TEMPERATURE 1 | INT | D100 | 0 | |<br>| TEMPERATURE 2 | INT | D101 | 0 | |<br>| TEMPERATURE 1 | INT | D200 | 0 | | | DURING DELETION<br>・FOR DELETED LABEL, DELETION FLAG IS CHANGED TO "1"<br>・NOT CHANGE ID INFORMATION<br>・INCREMENT ONLY VERSION |
| 4 | ID INFORMATION: xxxx-xxx-001; VERSION: 4<br><br>| LABEL NAME | DATA TYPE | ALLOCATION DESTINATION MEMORY ADDRESS | DELETION FLAG | |<br>|---|---|---|---|---|<br>| LAMP 1 | BOOL | Y10 | 0 | |<br>| LAMP 2 | BOOL | Y11 | 0 | |<br>| LAMP 3 | BOOL | Y12 | 0 | (RESTORED) |<br>| SWITCH 1 | BOOL | X40 | 0 | |<br>| SWITCH 2 | BOOL | X41 | 0 | |<br>| SWITCH 3 | BOOL | X42 | 0 | |<br>| SWITCH 4 | BOOL | X43 | 1 | |<br>| SWITCH 10 | BOOL | X50 | 0 | |<br>| TEMPERATURE 1 | INT | D100 | 0 | |<br>| TEMPERATURE 2 | INT | D101 | 0 | |<br>| TEMPERATURE 1 | INT | D200 | 0 | | | DURING DELETION RESTORATION<br>・FOR LABEL RESTORED FROM DELETION, DELETION FLAG IS CHANGED TO "0"<br>・NOT CHANGE ID INFORMATION<br>・INCREMENT ONLY VERSION |
| 5 | ID INFORMATION: xxxx-xxx-002; VERSION: 1<br><br>| LABEL NAME | DATA TYPE | ALLOCATION DESTINATION MEMORY ADDRESS | DELETION FLAG | |<br>|---|---|---|---|---|<br>| LAMP 1 | BOOL | Y10 | 0 | |<br>| LAMP 2 | BOOL | Y11 | 0 | |<br>| LAMP 3 | BOOL | Y12 | 0 | |<br>| SWITCH 1 | BOOL | X40 | 0 | |<br>| SWITCH 2 | BOOL | X41 | 0 | |<br>| SWITCH 3 | BOOL | X42 | 0 | |<br>| SWITCH 4 | BOOL | X43 | 1 | |<br>| SWITCH 10 | BOOL | X50 | 0 | |<br>| TEMPERATURE 1 | INT | D100 | 0 | |<br>| TEMPERATURE 2 | INT | D150 | 0 | (CHANGED) |<br>| TEMPERATURE 1 | DINT | D200 | 0 | (CHANGED) | | DURING DATA TYPE CHANGE, DURING ALLOCATION DESTINATION MEMORY ADDRESS CHANGE<br>・SEARCH FOR ID INFORMATION ANEW<br>・VERSION IS INITIALIZED WITH 1 |

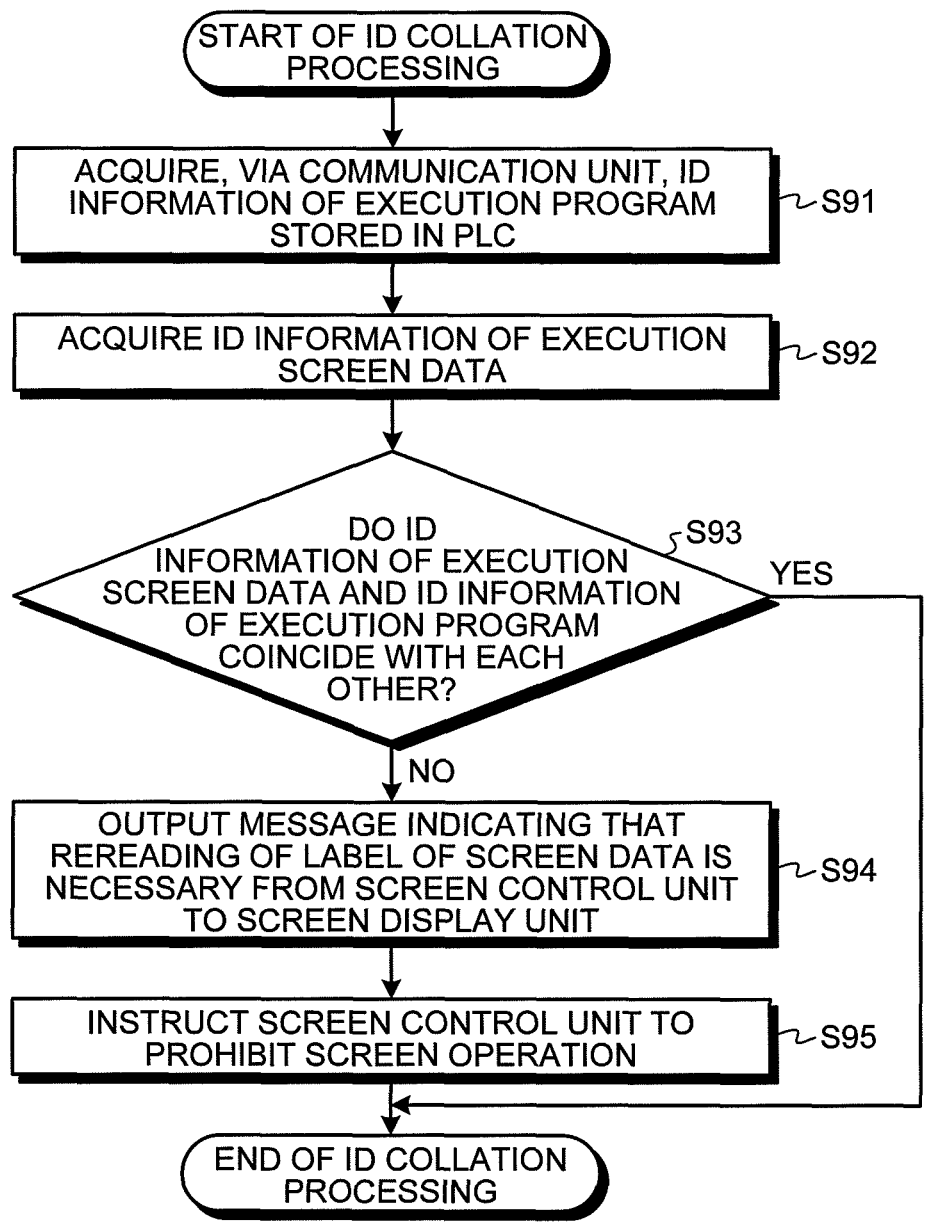

PROGRAMMABLE CONTROLLER SYSTEM AND DEVELOPMENT SYSTEM

CROSS REFERENCE TO RELATED APPLICATIONS

This application is a National Stage of International Application No. PCT/JP2010/050612 filed Jan. 20, 2010, the contents of all of which are incorporated herein by reference in their entirety.

FIELD

The present invention relates to a PLC system including a programmable controller (hereinafter simply referred to as PLC), a programmable display (hereinafter simply referred to as display) that displays a state of a device memory of the PLC, and a development system that creates a program for causing the PLC to operate and screen data for the display, and also relates to the development system.

BACKGROUND

The computer program for causing the PLC to operate is created using a programming apparatus. When a large-scale computer program is developed using this programming apparatus, for improvement of productivity and maintainability, programming employing labels (or tags or variables) is performed. For example, the IEC61131 standard by International Electrotechnical Commission regulates a high-level program language for a PLC employing labels.

The PLC cannot directly execute the computer program employing labels. Therefore, the programming apparatus converts the computer program employing labels into a program code executable by the PLC and downloads the converted program code to the PLC. Consequently, the PLC can execute the computer program created using labels.

The computer program is executed in the PLC and generates and updates input and output data for controlling external equipments such as industrial equipments and intermediate data for calculating the input and output data in a memory included in the PLC. In the following explanation, the input and output data and the intermediate data are collectively referred to as device data. This device data in the PLC is sometimes monitored and operated using a display or monitoring software on a personal computer. In the following explanation, the display is not limited to only a programmable display and includes an apparatus that displays device data in the PLC such as a personal computer that causes the monitoring software to operate. In the past, when screen data to be displayed on the display is created using a drawing apparatus, there is a technology that can use a label name for designation of this device data to be monitored and operated. This technology is hereinafter referred to as related art 1.

According to the related art 1, when the programming apparatus converts the computer program employing labels into the program code executable by the PLC, the programming apparatus allocates memory addresses corresponding to data types to the labels. According to this processing, label information formed by label-data type-memory address is generated. The drawing apparatus captures this label information, converts labels allocated to various components on screen data into memory addresses (device addresses) of an actual PLC data memory by referring to the captured label information, and downloads the memory addresses to the display. The display can acquire the device data to be monitored and operated from the memory addresses in the PLC allocated to the labels according to the label information.

Patent Literature 1 discloses a technology for utilizing ID information given to data for the purpose of realizing efficiency of data transmission and reception between a PLC and a programming apparatus. According to the technology disclosed in Patent Literature 1, the ID information is updated every time data of a computer program of the PLC is corrected. Because it is difficult to transmit and receive only the corrected data between the PLC and the programming apparatus, a transmission source and a reception destination compare the ID information and determine whether the data is corrected. As such ID information, data final correction date and time (a time stamp) is often used.

CITATION LIST

Patent Literature

Patent Literature 1: Japanese Patent Application Laid-open No. H10-333719

SUMMARY

Technical Problem

However, in the related art 1, when addition, deletion, or change of label definition is performed in the programming apparatus according to program correction by a user, the memory addresses allocated to the labels are sometimes changed to other memory addresses. Because the memory addresses of the labels on the display side refer to memory addresses before the program correction, if the computer program after the correction is directly downloaded to the PLC, the display displays device data stored in the memory addresses not intended by the user. This could cause a serious operation mistake. To avoid this problem, it is necessary to convert screen data based on label information of the latest state and download the converted label information to the display. Therefore, the user needs to determine whether the present screen data has been converted based on the label information of the latest state and, when determining that the present screen data is not based on the label information of the latest state, the user need to reconvert and re-download the screen data. This work is extremely complicated work for the user. Therefore, it is desirable that the work can be automatically performed.

For example, when the technology disclosed in Patent Literature 1 is combined with the related art 1, it is made possible to determine necessity of recreation and re-download of the screen data. This technology is referred to as related art 2. According to the related art 2, ID information is given to each of program data created by the programming apparatus, label information created from the program data, and screen data created by the drawing apparatus based on the label information. The display determines, based on consistency and inconsistency of this ID information, necessity of reconversion and re-download of the screen data.

Even when the label information is corrected, for example, when correction for not using several labels is performed, in some case, this does not lead to a situation in which a serious operation mistake is caused even if reconversion and re-download of the screen data are not performed. However, according to the related art 2, when the label information is changed even a little, the ID information added to the label information is updated every time. Therefore, inconsistency of the ID information occurs between the label information after the correction and the screen data based on the label information before the correction and it is determined that reconversion and re-download of the screen data are necessary. In short, in the related art 2, because it is necessary to perform the work for reconversion and re-download of the screen data every time the label information is corrected, efficiency of program development is deteriorated.

The present invention has been devised in view of the above and it is an object of the present invention to obtain a programmable controller system and a development system that can perform efficient program development.

Solution to Problem

In order to solve the afore-mentioned problems, a programmable controller system according to one aspect of the present invention is configured to include: a programmable controller (PLC) including a first memory that stores, in association with first identification information, a first program, in which a device address is used, for controlling external equipments, the programmable controller executing the first program; a display including a second memory that stores first screen data, in which a device address is used, in association with second identification information; and a development system including a program converting unit configured to generate the first program, which the first memory is caused to store, by allocating a device address to a label used in a second program in which the label is used instead of the device address, a label managing unit configured to generate label information, which is association for each label between the label used in the second program and the device address allocated to the label, when the program converting unit generates the first program, a label-information storing unit configured to store the label information, which is generated by the label managing unit, in association with the first identification information, and a drawing unit configured to generate the first screen data, which the second memory is caused to store, by converting the label used in the second screen data, in which the label is used instead of a device address, into the device address based on the label information stored by the label-information storing unit, and associate a value same as the first identification information, which has been associated with the label information at a point when the first screen data was generated, with the generated first screen data as the second identification information, wherein when the program converting unit regenerates the first program, the label managing unit updates the label information stored by the label-information storing unit to correspond to the regeneration of the first program and executes or does not execute, according to update content of the label information, update of the first identification information associated with the label information and the regenerated first program, and the display determines whether the first identification information associated with the first program executed by the PLC and the second identification information associated with the first screen data stored by the second memory coincide with each other, when these kinds of identification information coincide with each other, acquires, based on the first screen data stored by the second memory, content of the device address from the PLC and displays the content, and, when these kinds of identification information do not coincide with each other, executes abnormality processing.

Advantageous Effects of Invention

According to the present invention, there is an effect that it is possible to perform efficient program development.

BRIEF DESCRIPTION OF DRAWINGS

FIG. 1 is a diagram of the configuration of a PLC system according to an embodiment of the present invention.

FIG. 2 is a diagram for explaining update rules for ID information and a version.

FIG. 12 is a flowchart for explaining ID collation processing.

DESCRIPTION OF EMBODIMENTS

Figure 3:
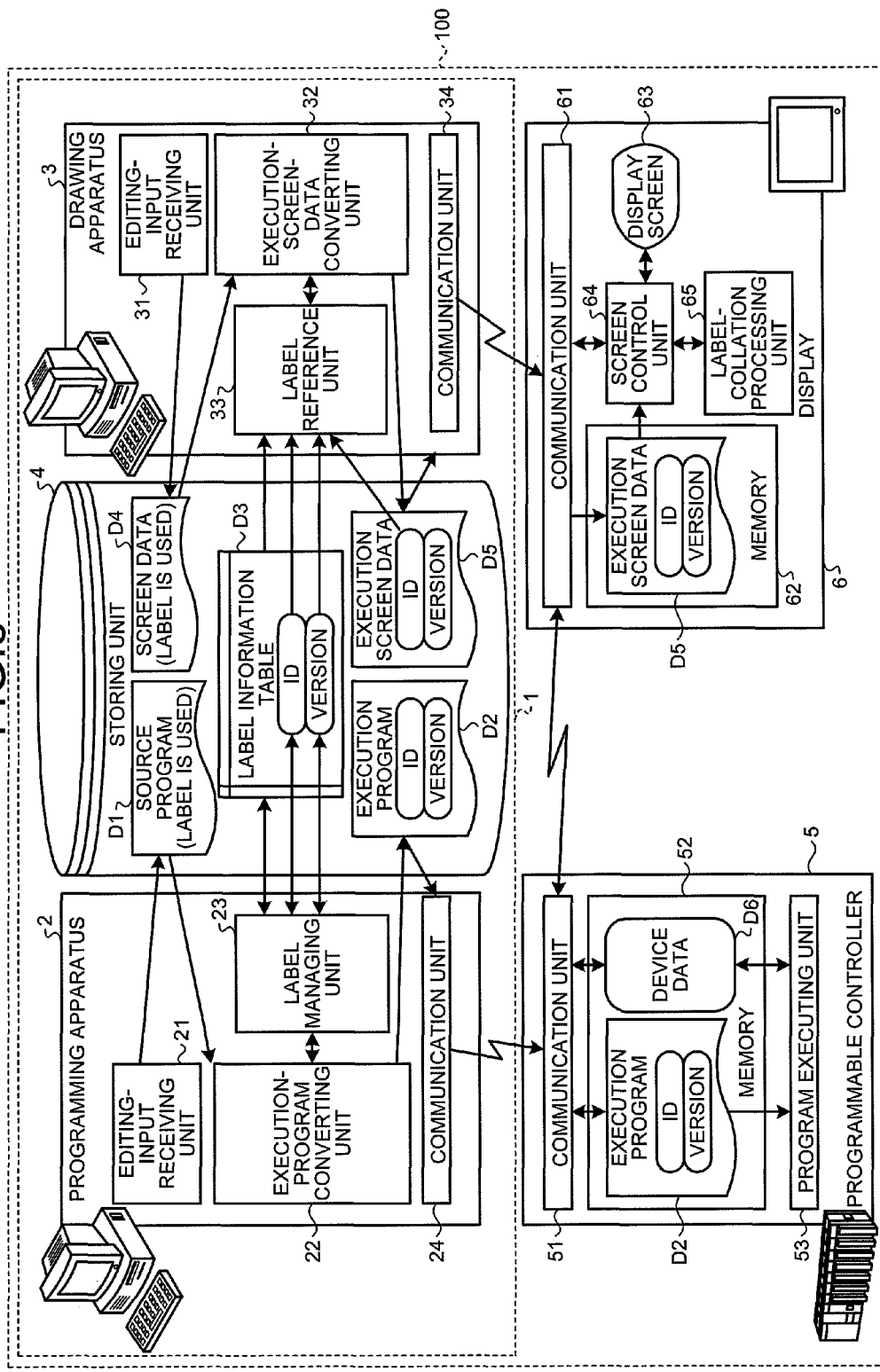
FIG. 3 is a diagram for explaining a functional configuration of the PLC system according to the embodiment of the present invention.

An embodiment of a programmable controller system and a development system according to the present invention is explained in detail below based on the drawings. The present invention is not limited by this embodiment.

Embodiment

FIG. 1 is a diagram of the configuration of an embodiment of a programmable controller (PLC) system according to the present invention.

As shown in FIG. 1, a PLC system 100 includes a development system 1 including a programming apparatus 2, a drawing apparatus 3, and a storing unit 4 accessible from both of the programming apparatus 2 and the drawing apparatus 3, a PLC 5, and a programmable display (a display) 6.

A user creates a source program D1, which is a program for creating an execution program D2 executable by the PLC 5, such as a ladder program. In the source program D1, a label for designating a memory address of a memory included in the PLC 5 is defined. A label corresponding to the memory address is described instead of the memory address. The label in the source program D1 can be defined by two types of descriptions: a type for defining a name of the label (a label name) and a data type of the label (an automatic allocation type) and a type for further defining a memory address in addition to the description of the automatic allocation type (a manual allocation type).

The programming apparatus 2 compiles the source program D1 created by the user. In the case of the automatic allocation type, the programming apparatus 2 allocates a memory address of the PLC 5 matching a data type defined for each label to the label and generates the execution program D2 in a format executable by the PLC 5. In the generated execution program D2, the label used in the source program D1 has been converted into a memory address of a data memory of the PLC 5.

In an example shown in FIG. 1, a label "switch 1" and a label "lamp 2" are used in the source program D1. In the execution program D2, the label "switch 1" has been converted into a memory address "X10" and the label "lamp 2" has been converted into a memory address "Y20". The execution program D2 is downloaded to the PLC 5. The PLC 5 executes cyclic processing based on the downloaded execution program D2.

When the programming apparatus 2 converts the source program D1 into the execution program D2, the programming apparatus 2 generates a table of label information (a label information table D3) including a label name included in the source program D1, a data type of the label, and a memory address of an allocation destination of the label (an allocation destination memory address) and stores (registers) the label information table D3 in the storing unit 4. The label information table D3 includes a field in which a flag indicating a state of each kind of label information (a deletion flag) is described. Label information in a state in which the deletion flag is 0 is treated as effective label information. Label information in a state in which the deletion flag is 1 is treated as being deleted from the label information table D3. Respective kinds of label information included in the label information table D3 are sometimes expressed simply as records. In the example shown in FIG. 1, the label information table D3 includes label information indicating the label "switch 1", the data type of which is "BOOL (Boolean type)" and the allocation destination memory address of which is "X10", and label information indicating the label "lamp 2", the data type of which is "BOOL" and the allocation destination memory address "Y20".

The user creates screen data D4, which is setting data for displaying content of device data used in the PLC 5 on the display 6, and inputs the created screen data D4 to the drawing apparatus 3. In the screen data D4, a label corresponding to a memory address is described instead of the memory address. The drawing apparatus 3 refers to the label information table D3 stored by the storing unit 4. The drawing apparatus 3 converts, based on the label information table D3, a label included in the screen data D4 into a memory address and generates execution screen data D5, which is setting data in a format executable by the display 6.

The generated execution screen data D5 is downloaded to the display 6. The display 6 acquires the device data from the memory address described in the downloaded execution screen data D5 in the memory included in the PLC 5 and displays the acquired device data in a display system described in the execution screen data D5. The display 6 can receive an input for manipulating the device data by the user and transmits the received input to the PLC 5.

In the example shown in FIG. 1, the screen data D4 includes a figure of a button indicating the label "switch 1" and a figure of a lamp indicating the label "lamp 2". The execution screen data D5 includes a figure of a button indicating the memory address "X10" corresponding to the label "switch 1" and a figure of a lamp indicating the memory address "Y20" corresponding to the label "lamp 2". The display 6 transmits operation for turning on and off the button indicating the memory address "X10" by the user to the PLC 5. The PLC 5 transmits the device data stored in the memory address "Y20" to the display 6.

When the source program D1 is corrected by the user and the execution program D2 is regenerated, it is necessary to regenerate the execution screen data D5 corresponding to the regenerated execution program D2 and download the regenerated execution screen data D5 to the display 6. Therefore, to make it possible to automatically determine whether it is necessary to regenerate the execution screen data D5, the programming apparatus 2 and the drawing apparatus 3 give ID information for enabling execution of the automatic determination respectively to the execution program D2 and the execution screen data D5. In this embodiment, to reduce a frequency of determining that reconversion is necessary, when correction of the source program D1 is correction with which the source display 6 performs display (wrong operation) likely to cause an operation mistake of the user unless reconversion of the execution screen data D5 is performed, the ID information given to the execution program D2 is updated.

More specifically, when the programming apparatus 2 generates the execution program D2, the programming apparatus 2 generates ID information (first identification information) and gives the generated ID information to the execution program D2 and the label information table D3. When the programming apparatus 2 regenerates the execution program D2, the programming apparatus 2 updates the ID information based on update rules explained later. When the drawing apparatus 3 generates the execution screen data D5, the drawing apparatus 3 generates ID information having the same value as the ID information given to the label information table D3 and gives the generated ID information (second identification information) to the execution screen data D5.

The display 6 executes ID collation processing for determining whether reconversion of the execution screen data D5 is necessary by collating, between the display 6 and the PLC 5, the ID information of the execution screen data D5 executed by the display 6 and the ID information of the execution program D2 executed by the PLC 5. When these kinds of ID information are different, the display 6 executes abnormality processing for preventing a wrong operation. As an example of the abnormality processing, a message indicating that rereading of a screen (reconversion and re-download of the execution screen data D5) is necessary is displayed and a display screen is locked.

When the drawing apparatus 3 reconverts the screen data D4, the drawing apparatus 3 collates (compares) the ID information given to the execution screen data D5 corresponding to the screen data D4 and the ID information of the label information table D3. When these kinds of ID information are different, the drawing apparatus 3 executes reconversion of the screen data D4. When the both kinds of ID information are the same, the drawing apparatus 3 does not execute reconversion of the screen data D4.

Further, to enable the user to recognize presence or absence of a change including a change in which reconversion and re-download of the execution screen data D5 are unnecessary, the programming apparatus 2 gives version information (hereinafter simply referred to as version) to the execution program D2 and the label information table D3 besides the ID information. The drawing apparatus 3 also gives a version, which has been given to the label information table D3, to the execution screen data D5.

In the example shown in FIG. 1, an ID "20081224212030" and a version "2" are given to the execution program D2 and the label information table D3. An ID "20081224212030" and a version "1" are given to the execution screen data D5.

Update rules for ID information and a version by the programming apparatus 2 are explained. FIG. 2 is a diagram for explaining the update rules for ID information and a version by the programming apparatus 2. In the figure shown in FIG. 2, in order from a column on the left, a case number for explaining the update rules, an example of the label information table D3, operation for the label information table D3, and measures that the programming apparatus 2 takes with respect to the ID information and the version corresponding to the operation are shown.

A case number 1 indicates that the execution program D2 is generated anew and the label information table D3 is generated anew according to the generation of the execution program D2. The label information table D3 includes label information concerning labels of "lamp 1", "lamp 2", "lamp 3", "switch 1", "switch 2", "switch 3", "switch 4", "temperature 1", and "temperature 2". ID information "xxxx-xxx-001" and a version "1" are also given to the label information table D3. Deletion flags of all kinds of label information are "0". This state is referred to as initial state.

A case number 2 indicates that a label "switch 10" and a label "humidity 1" are added to the state of the case number 1. In the case of the case number 2, the display 6 cannot display states of memory addresses corresponding to the added labels unless the user corrects the screen data D4 such that the added labels can be displayed. However, the display 6 can continue to display device data stored in memory addresses intended by the user as display of the device data. In other words, even if reconversion by the drawing apparatus 3 is performed, a situation does not occur in which the display 6 performs wrong display likely to cause a serious operation mistake. Therefore, when labels are added, the programming apparatus 2 does not change the ID information and increments the version. Here, the version is incremented to "2".

A case number 3 indicates that the label "lamp 3" and the label "switch 4" are deleted from the state of the case number 2. Specifically, a state of a deletion flag of label information of the label "lamp 3" and the label "switch 4" included in the label information table D3 is "1". In the case of the case number 3, because a state of memory addresses corresponding to the deleted label is not updated, display of the memory addresses does not change on the screen. However, as in the state in the case number 2, even if the screen data D4 is not corrected, the display 6 can continue to display device data stored in memory addresses intended by the user as display of the device data. In other words, even if reconversion by the drawing apparatus 3 is not performed, a situation does not occur in which the display 6 performs wrong display that is likely to cause a serious operation mistake. Therefore, when labels are deleted, the programming apparatus 2 does not change the ID information and increments the version. Here, the version is incremented to "3".

A case number 4 indicates that the label "lamp 3" once deleted is restored from the state of the case number 3. Specifically, the deletion flag "1" of the label information of the label "lamp 3" in the case number 3 is changed to "0". In the case number 4, as in the case number 2, even if reconversion by the drawing apparatus 3 is not performed, a situation does not occur in which the display 6 performs wrong display that is likely to cause a serious operation mistake. Therefore, when labels are restored, the programming apparatus 2 does not change the ID information and increments the version. Here, the version is incremented to "4".

A case number 5 indicates that an allocation destination memory address of the label "temperature 2" is changed and a data type of the label "humidity 1" is changed from the state of the case number 4. A change of an allocation destination memory address occurs, in addition to the case in which an allocation destination memory address included in the description of the manual allocation type is changed by the user in the source program D1, in a case in which the definition of the data type included in the description of the automatic allocation type is changed. When the data type is changed, if the execution screen data D5 is used without being reconverted, the display 6 cannot correctly display device data stored in a memory address intended by the user. When an allocation destination memory address is changed, the display 6 displays, as a state of a memory address corresponding to a changed label, a state of device data stored in a memory address before the change (i.e., device data not intended by the user). Then, there is a possibility that the user misrecognizes that the displayed state of the device data is a state of device data stored in the memory address corresponding to the label and make a serious operation mistake. Therefore, in the case number 5, reconversion by the drawing apparatus 3 is necessary. The programming apparatus 2 numbers the ID information anew (updates the ID information) and initializes the version to 1. Here, new ID information "xxxx-xxx-002" is given to the label information table D3.

As explained above, in this embodiment, unlike the related art 2, the ID information is not updated every time the source program D1 is changed, but update of the ID information is executed or not executed according to update content of the label information table D3. Therefore, it is possible to reduce the frequency of reconversion of the screen data D4 (and download of the regenerated execution screen data D5) by the drawing apparatus 3. As a result, it is made possible to perform efficient program development.

FIG. 3 is a diagram for explaining a functional configuration of the PLC system 100 according to this embodiment. As shown in the figure, in the storing unit 4, the source program D1, the execution program D2, the screen data D4, and execution screen data D5 are stored besides the label information table D3. In the following explanation, it is assumed that the source program D1 and the screen data D4 have already been created and stored in the storing unit 4.

The programming apparatus 2 includes an editing-input receiving unit 21, an execution-program converting unit 22, a label managing unit 23, and a communication unit 24.

The editing-input receiving unit 21 receives an editing input of the source program D1 from the user and reflects editing-input content in the source program D1 stored in the storing unit 4.

The execution-program converting unit 22 converts the source program D1 stored in the storing unit 4 to generate the execution program D2 and stores the generated execution program D2 in the storing unit 4. It is assumed that, in a case in which the execution-program converting unit 22 reconverts the source program D1 (i.e., regenerates the execution program D2), the execution program D2 is overwritten with the new execution program D2 generated by the reconversion. The new execution program D2 generated by the reconversion can be accumulated and stored rather than overwritten.

The label managing unit 23 generates the label information table D3 based on association of a label described in the source program D1 and a memory address allocated to the label when the execution-program converting unit 22 generates the execution program D2 or a memory address allocated according to the description of the manual allocation type. In generating the label information table D3, the label managing unit 23 generates ID information and a version and gives the ID information and the version to the generated execution program D2 and the generated label management table D3.

Further, when the execution-program converting unit 22 reconverts the execution program D2, the label managing unit 23 corrects the label information table D3 to correspond to reconverted content. In correcting the label information table D3, the label managing unit 23 updates the ID information and the version of the execution program D2 and the label information table D3 based on the update rules explained above.

The communication unit 24 downloads the execution program D2 stored in the storing unit 4 to the PLC 5.

The drawing apparatus 3 includes an editing-input receiving unit 31, an execution-screen-data converting unit 32, a label reference unit 33, and a communication unit 34.

The editing-input receiving unit 31 receives an editing input of the screen data D4 from the user and reflects the received editing-input content in the screen data D4 stored in the storing unit 4.

The label reference unit 33 reads out the label information table D3 stored in the storing unit 4, and also the ID information and the version given to the label information table D3.

The execution-screen-data converting unit 32 converts, based on the label information table D3 read out by the label reference unit 33, the screen data D4 stored in the storing unit 4 to generate the execution screen data D5 and stores the generated execution screen data D5 in the storing unit 4.

The label reference unit 33 gives the ID information and the version, which have been given to the label information table D3, to the execution screen data D5 generated by the execution-screen-data converting unit 32. When the execution screen data D5 is stored in the storing unit 4, the label reference unit 33 reads out ID information of the execution screen data D5 stored in the storing unit 4. The label reference unit 33 compares the ID information of the label information table D3 and the ID information of the execution screen data D5, and determines whether reconversion of the screen data D4 is necessary. When the label reference unit 33 determines that the reconversion is necessary, the label reference unit 33 causes the execution-screen-data converting unit 32 to execute reconversion of the screen data D4.

The communication unit 34 downloads the execution screen data D5 stored in the storing unit 4 to the display 6.

The PLC 5 includes a communication unit 51, a memory 52, and a program executing unit 53. The communication unit 51 receives the execution program D2 transmitted by the programming apparatus 2 and stores the received execution program D2 in the memory 52. The program executing unit 53 executes cyclic processing based on the execution program D2 stored in the memory 52 and generates device data D6. The program executing unit 53 stores the device data D6 in the memory 52. The communication unit 51 performs communication between the PLC 5 and the display 6. Specifically, the communication unit 51 reads out the ID information of the execution program D2 from the memory 52 and notifies the display 6 of the read-out ID information. The communication unit 51 reads out data stored in a memory address in the memory 52, from which readout is requested by the display 6, from the device data D6, and transmits the read-out data to the display 6.

The display 6 includes a communication unit 61, a memory 62, a display screen 63, a screen control unit 64, and a label-collation processing unit 65.

The communication unit 61 receives the execution screen data D5 transmitted by the drawing apparatus 3 and stores the received execution screen data D5 in the memory 62. The communication unit 61 receives the ID information of the execution program D2 transmitted by the PLC 5 and transmits the received ID information of the execution program D2 to the screen control unit 64.

The display screen 63 is a display unit for displaying data such as a liquid crystal display. The display screen 63 can be a display screen including an input unit such as a touch panel or hard switches for receiving an input for manipulating device data by the user.

The screen control unit 64 transmits the ID information of the execution program D2, which is received by the communication unit 61 from the PLC 5, to the label-collation processing unit 65. The screen control unit 64 reads out the ID information given to the execution screen data D5 stored in the memory 62 and transmits the read-out ID information of the execution screen data D5 to the label-collation processing unit 65.

The label-collation processing unit 65 executes ID collation processing for comparing the ID information of the execution screen data D5 and the ID information of the execution program D2. When a comparison result is "inconsistent", the label-collation processing unit 65 instructs the screen control unit 64 to execute abnormality processing. The screen control unit 64 that receives the instruction causes the display screen 63 to output the message and locks the screen output of the display screen 63. When the display screen 63 includes the input unit, reception of an input to the input unit can be locked.

When the comparison result by the ID collation processing is "consistent", the label-collation processing unit 65 causes the screen control unit 64 to operate normally. The screen control unit 64 reads out the execution screen data D5 from the memory 62, executes the read-out execution screen data D5, and renders indication on the display screen 63. In rendering the display, the screen control unit 64 requests, via the communication unit 61, the PLC 5 to transmit data stored in a memory address descried in the execution screen data. The screen control unit 64 outputs the data, which is received from the PLC 5 via the communication unit 61, to the display screen 63 in a format based on the description of the execution screen data D5.

The development system 1 can be realized by executing a computer program on hardware having a normal computer configuration. As an example, a hardware configuration example in which the programming apparatus 2, the drawing apparatus 3, and the storing unit 4 are realized by one computer is explained.

Figure 4:
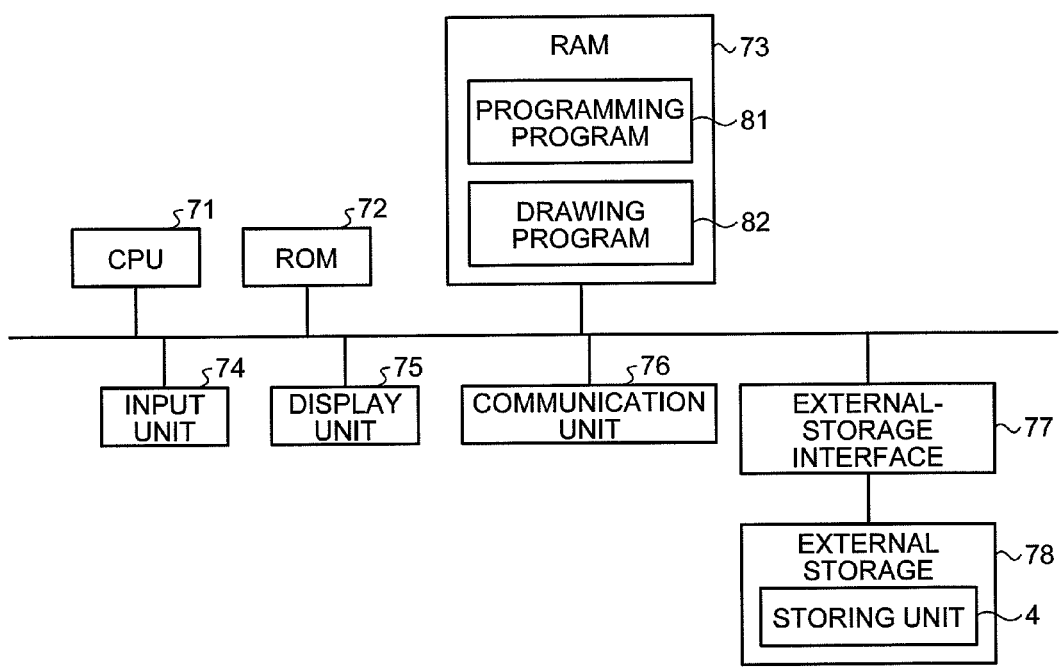
FIG. 4 is a diagram for explaining a hardware configuration of a development system according to the embodiment of the present invention.

FIG. 4 is a diagram for explaining a hardware configuration of the development system 1. As shown in the figure, the development system 1 includes a CPU (Central Processing Unit) 71, a ROM (Rea Only Memory) 72, a RAM (Random Access Memory) 73, an input unit 74, a display unit 75, a communication unit 76, an external storage interface 77, and an external storage 78. The CPU 71, the ROM 72, the RAM 73, the input unit 74, the display unit 75, the communication unit 76, and the external storage interface 77 are connected to one another via a bus line. The external storage 78 is connected to the external storage interface 77.

The CPU 71 executes a programming program 81 and a drawing program 82, which are computer programs for respectively realizing the programming apparatus 2 and the drawing apparatus 3. The communication unit 76 is a communication interface used in downloading the execution program D2 and the execution screen data D5 respectively to the PLC 5 and the display 6. The external storage 78 is a readable and writable storage area such as a hard disk or an SSD (Solid State Drive) and functions as the storing unit 4. The external storage interface 77 is an interface with which the CPU 71 accesses the external storage 78 functioning as the storing unit 4. The display unit 75 is a display device such as a liquid crystal monitor. The display unit 75 displays, based on an instruction from the CPU 71, output information to the user such as an operation screen. The display unit 75 functions as the display screen 63. The input unit 74 includes a mouse and a keyboard. The operation of the development system 1 from the user is input to the input unit 74. Operation information input to the input unit 74 is sent to the CPU 71.

The programming program 81 and the drawing program 82 are stored in the ROM 72 and loaded to the RAM 73 via the bus line. The CPU 71 executes the programming program 81 and the drawing program 82 loaded into the RAM 73. Specifically, the CPU 71 reads out the programming program 81 and the drawing program 82 from the ROM 72, expands the programming program 81 and the expanded drawing program 82 respectively in program storage areas in the RAM 73, and executes the operation of the development system 1 (the programming apparatus 2 and the drawing apparatus 3) based on the expanded programming program 81 and the drawing program 82. Intermediate data generated when the operation is executed is stored in a work area in the RAM 73. The programming program 81 and the drawing program 82 can be stored in a storage such as the external storage 78. Also the programming program 81 and the drawing program 82 can be loaded to a storage device such as the external storage 78.

The programming program 81 executed by the development system 1 according to the first embodiment includes editing-input receiving means 21, execution-program converting means 22, label managing means 23, and communication means 24. These means are loaded onto the RAM 73 and the editing-input receiving unit 21, the execution-program converting unit 22, the label managing unit 23, and the communication unit 24 are generated on the RAM 73. The drawing program 82 executed in the development system 1 according to this embodiment includes editing-input receiving means 31, execution-screen-data converting means 32, label reference means 33, and communication means 34. These means are loaded onto the RAM 73 and the editing-input receiving unit 31, the execution-screen-data converting unit 32, the label reference unit 33, and the communication unit 34 are generated on the RAM 73.

The programming program 81 and the drawing program 82 executed by the development system 1 according to this embodiment can be stored on a computer connected to a network such as the Internet and provided by being downloaded through the network. The programming program 81 and the drawing program 82 executed by the development system 1 according to this embodiment can be provided or distributed via a network such as the Internet. The programming program 81 and the drawing program 82 according to this embodiment can be incorporated in the ROM 72 or the like in advance and provided to the development system 1 according to this embodiment.

The development system 1 can be realized by a plurality of computers. For example, the programming program 81 and the drawing program 82 can be realized by separate computers to respectively function as the programming apparatus 2 and the drawing apparatus 3. The external storage 78 of one of computers of the programming apparatus 2 and the drawing apparatus 3 can be caused to function as the storing unit 4, and the computer not including the storing unit 4 can access the storing unit 4 via the network. A detachable and rewritable storage medium can be caused to function as the storing unit 4, and the storage medium can be mounted on an operation target apparatus when the programming apparatus 2 or the drawing apparatus 3 is operated by the user. The storing unit 4 can be realized in a server-type computer accessible from the computers, and the programming apparatus 2 and the drawing apparatus 3 can access the server-type computer via the network.

Figure 5:
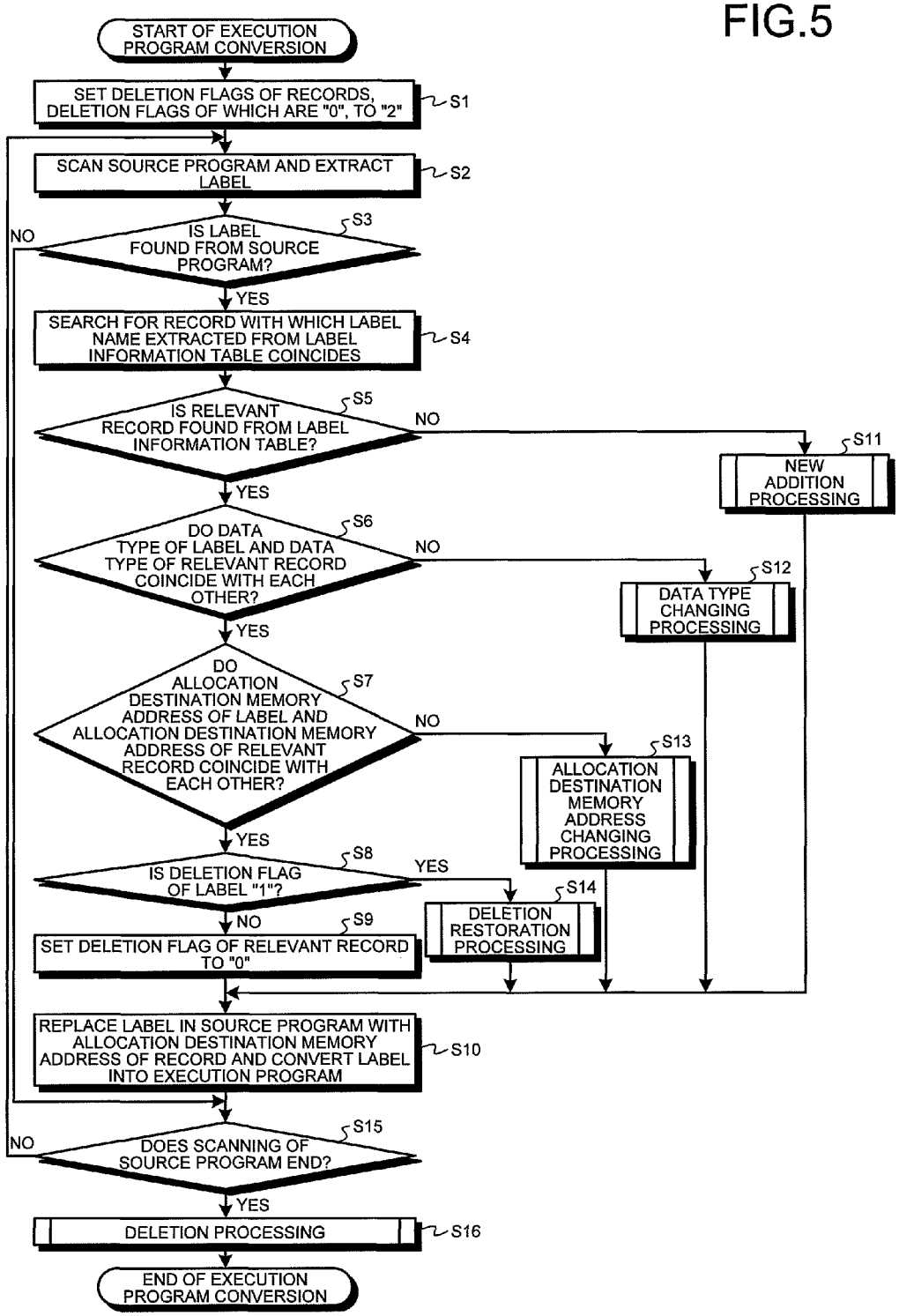
FIG. 5 is a flowchart for explaining the operation of execution program conversion.

The operation of the PLC system 100 according to the embodiment of the present invention is explained with reference to FIGS. 5 to 12. FIG. 5 is a flowchart for explaining the operation of the programming apparatus 2 for converting the source program D1 into the execution program D2 (execution program conversion).

As shown in FIG. 5, when the programming apparatus 2 receives an input of an instruction for converting the source program D1 from the user, the label managing unit 23 sets deletion flags of all records of the label information table D3 to a temporary value ("2") that is neither "0" nor "1" (step S1). The label managing unit 23 scans one row of the source program D1 and attempts to extract a description of a definition of a label from the scanned row (step S2). The label managing unit 23 determines whether a label is found in the source program D1, i.e., whether a definition of a label is described in the scanned row (step S3).

When a definition of a label is not described in the scanned row (No at step S3), the processing shifts to step S15 explained later. When a definition of a label is described in the scanned row (Yes at step S3), the label managing unit 23 searches for a record, a label name of which coincides with the label extracted at step S2, in the label information table D3 (step S4). The label managing unit 23 determines whether the relevant record is found from the label information table D3 (step S5).

When the relevant record is found (Yes at step S5), the label managing unit 23 compares a data type of the extracted label and a data type of the relevant record and determines whether the data types coincide with each other (step S6).

When the data types coincide with each other (Yes at step S6), the label managing unit 23 compares an allocation destination memory address of the extracted label and an allocation destination memory address of the relevant record and determines whether the allocation destination memory addresses coincide with each other (step S7).

When the allocation destination memory addresses coincide with each other (Yes at step S7), the label managing unit 23 determines whether a deletion flag of the relevant record is "1" (step S8).

When the deletion flag is not "1" (No at step S8), the label managing unit 23 sets the deletion flag to "0" (step S9). The execution-program converting unit 22 replaces a label of a relevant row of the source program D1 with the allocation destination memory address described in the record and converts into an execution program code forming the execution program D2 (step S10).

When the relevant record is not found from the label information table D3 at step S5 (No at step S5), the processing shifts to new addition processing for adding a label anew (step S11).

Figure 6:
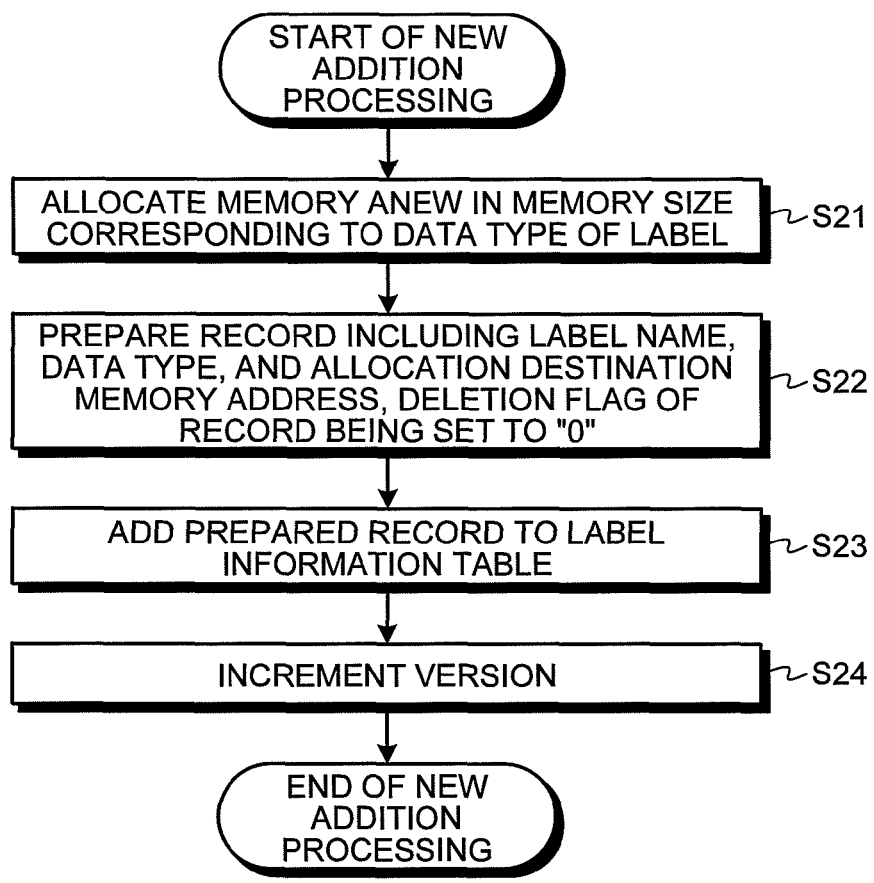
FIG. 6 is a flowchart for explaining new addition processing in detail.

FIG. 6 is a flowchart for explaining the new addition processing in detail. As shown in the figure, first, the execution-program converting unit 22 allocates, in an area where the device data D6 of the memory 52 of the PLC 5 is stored, an area of a memory size corresponding to the data type of the label extracted at step S2 to the extracted label (step S21). When the area is allocated to the extracted label, the label managing unit 23 allocates, referring to all records irrespective of values of deletion flags, an area, which is not described in any record, to the extracted label.

Then, the label managing unit 23 prepares a record including a label name of the label extracted at step S2, a data type of the label, and the memory address allocated at step S21 (step S22). A deletion flag of this record is set to "0".

The label managing unit 23 adds the prepared record to the label information table D3 (step S23). The label managing unit 23 increments versions of the label information table D3 and the execution program D2 (step S24) and the new addition processing ends. After the new addition processing ends, the processing shifts to step S10.

When the data types do not coincide with each other at step S6 (No at step S6), the processing shifts to data type changing processing for changing a data type of a label (step S12).

Figure 7:
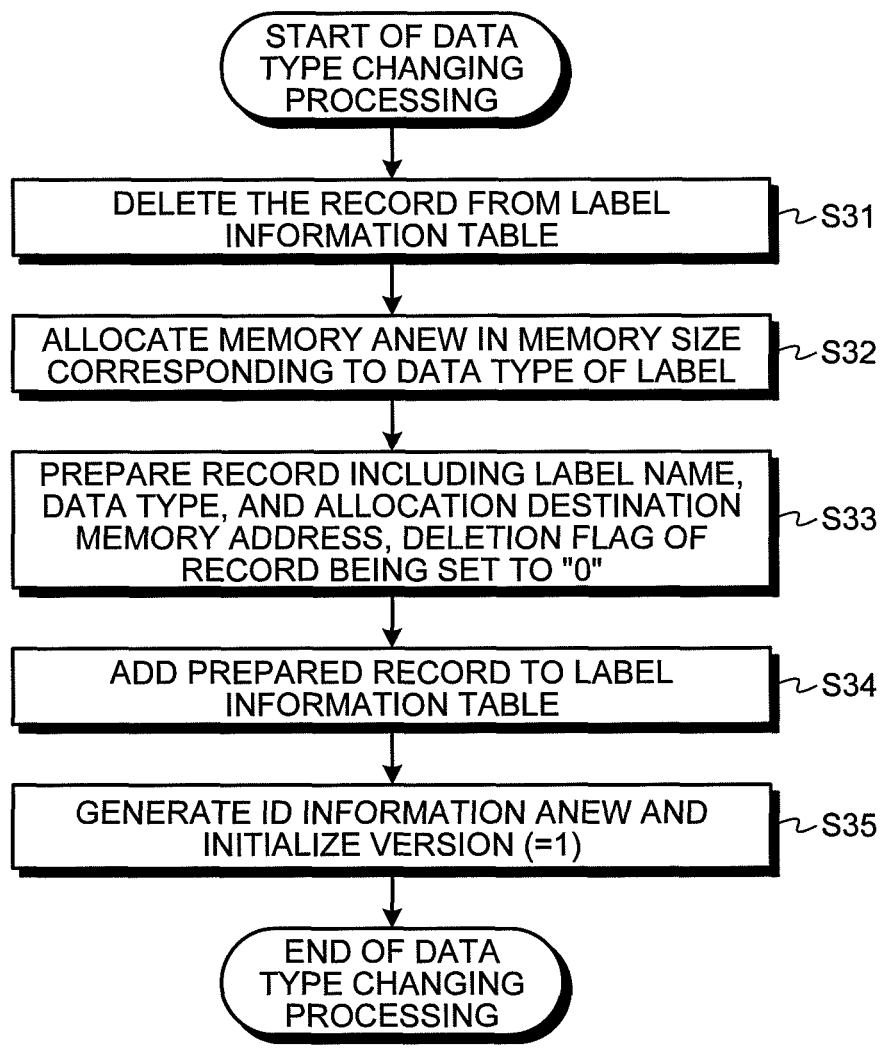
FIG. 7 is a flowchart for explaining data type changing processing in detail.

FIG. 7 is a flowchart for explaining the data type changing processing in detail. As shown in the figure, first, the label managing unit 23 deletes the relevant record from the label information table D3 (step S31). At step S31, the label managing unit 23 actually deletes the record from the label information table D3 rather than setting a deletion flag in the record.

Then, the execution-program converting unit 22 allocates, in an area where the device data D6 of the memory 52 of the PLC 5 is stored, an area corresponding to the data type of the label extracted at step S2 to the label (step S32).

The label managing unit 23 prepares a record including the label name of the label extracted at step S2, the data type of the label, and the allocation destination memory address allocated at step S32 (step S33). A deletion flag of this record is also set to "0".

The label managing unit 23 adds the prepared record to the label information table D3 (step S34). The label managing unit 23 generates ID information of the label information table D3 and the execution program D2 anew and initializes the versions thereof (i.e., versions="1") (step S35). The data type changing processing ends. After the data type changing processing ends, the processing shifts to step S10.

When the allocation destination memory address of the extracted label and the allocation destination memory address of the relevant record do not coincide with each other at step S7 (No at step S7), the processing shifts to allocation destination memory address changing processing for changing an allocation destination memory address of a label (step S13).

Figure 8:
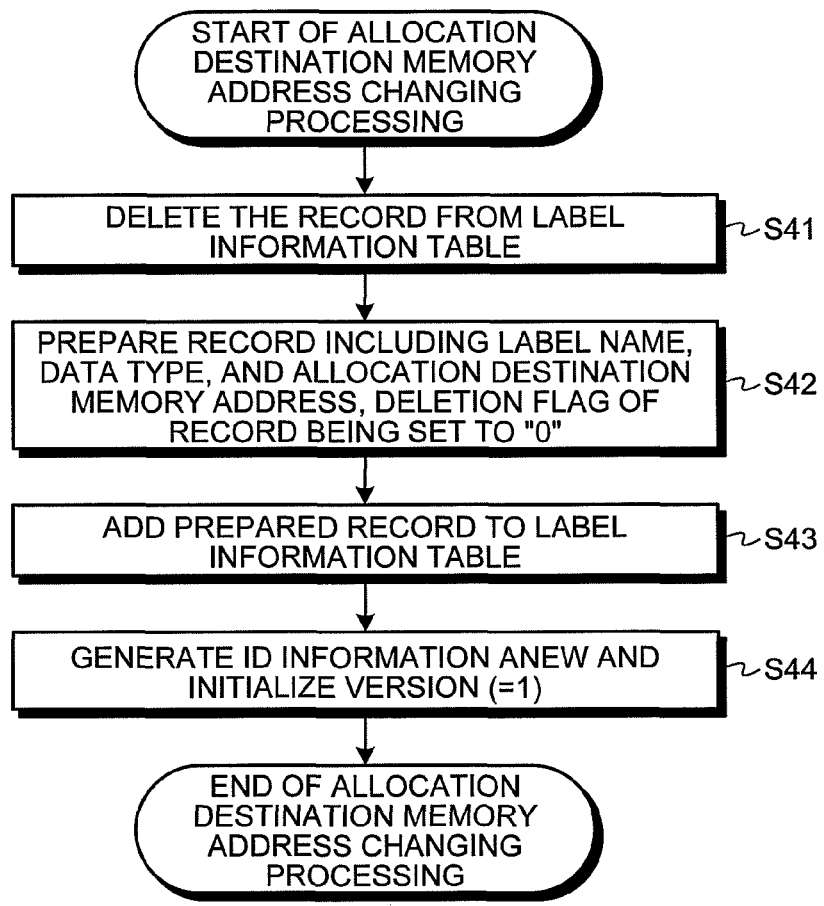
FIG. 8 is a flowchart for explaining allocation destination memory address changing processing in detail.

FIG. 8 is a flowchart for explaining the allocation destination memory address changing processing in detail. As shown in the figure, first, as at step S31, the label managing unit 23 deletes the relevant record from the label information table D3 (step S41).

The label managing unit 23 prepares a record including the label name of the label extracted at step S2, the data type of the label, and the allocation destination memory address allocated to the extracted label (step S42). A deletion flag of this record is also set to "0".

The label managing unit 23 adds the prepared record to the label information table D3 (step S43). The label managing unit 23 then generates ID information of the label information table D3 and the execution program D2 anew (updates the ID information) and initializes the versions thereof (step S44). The allocation destination memory address changing processing ends. After the allocation destination memory address changing processing ends, the processing shifts to step S10.

When the deletion flag of the relevant record is "1" at step S8 (Yes at step S8), the processing shifts to deletion restoration processing for restoring a label treated as being deleted (step S14).

Figure 9:
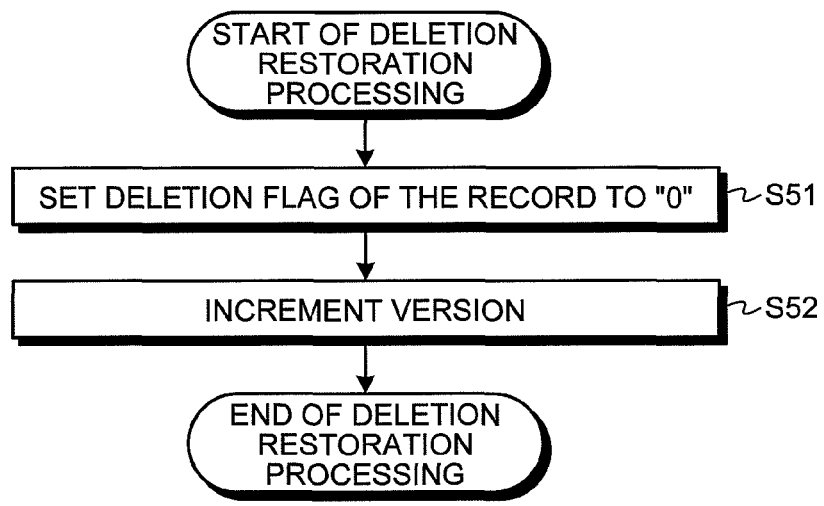
FIG. 9 is a flowchart for explaining deletion restoration processing in detail.

FIG. 9 is a flowchart for explaining the deletion restoration processing in detail. As shown in the figure, first, the label managing unit 23 changes the deletion flag of the relevant record from "1" to "0" (step S51). The label managing unit 23 increments the versions of the label information table D3 and the execution program D2 (step S52) and the deletion restoration processing ends. After the deletion restoration processing ends, the processing shifts to step S10.

After undergoing step S10, the label managing unit 23 determines whether scanning of all rows of the source program D1 ends (step S15). When the scanning does not end (No at step S15), the processing shifts to step S2 and the label managing unit 23 continues the scanning. When the scanning ends (Yes at step S15), the processing shifts to deletion processing for deleting a label (step S16).

Figure 10:
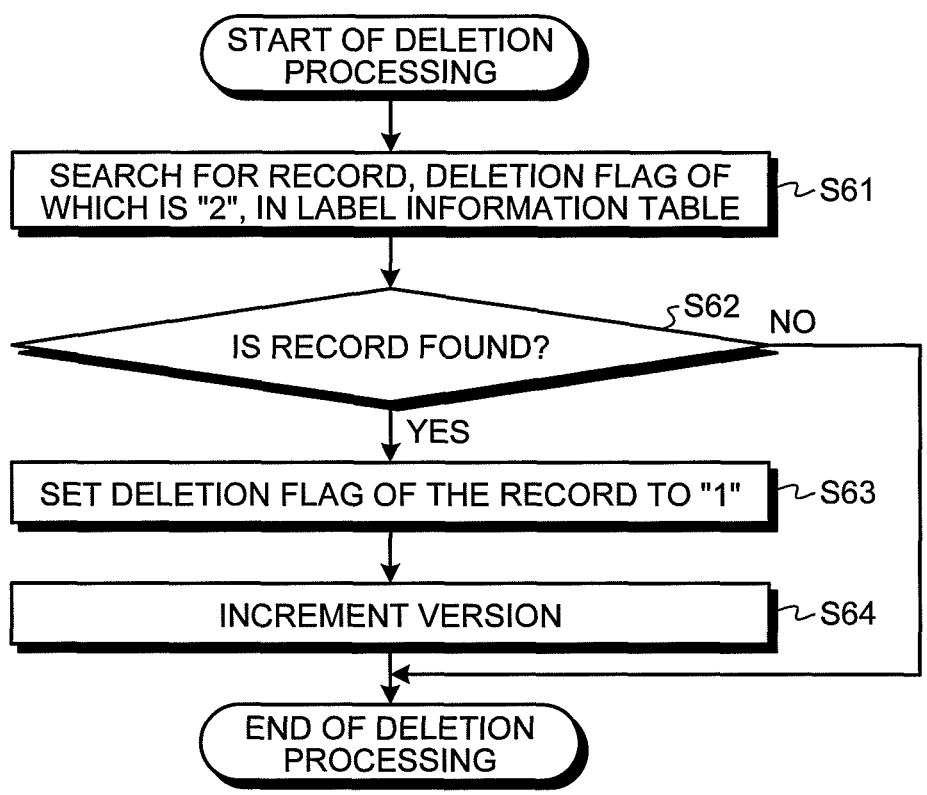
FIG. 10 is a flowchart for explaining deletion processing in detail

FIG. 10 is a flowchart for explaining the deletion processing in detail. As shown in the figure, first, the label managing unit 23 searches for a record, the value of a deletion flag of which is "2", in the label information table D3 (step S61). The label managing unit 23 determines whether a record, a deletion flag of which is "2", is found (step S62). When the record is not found (No at step S62), the deletion processing ends.

When a record, the deletion flag of which is "2", is fond (Yes at step S62), the label managing unit 23 changes the deletion flag of the record from "2" to "1" (step S63). The label managing unit 23 increments the versions of the label information table D3 and the execution program D2 (step S64) and the deletion processing ends.

After undergoing the deletion processing, the operation of the execution program conversion ends.

In the execution program conversion, the source program D1 is scanned row by row. However, the source program D1 can be scanned in a plurality of rows at a time. When a plurality of labels are found from the scanned rows at step S2, it is advisable to sequentially execute the operations at steps S4 to S8 for each of the found labels. Alternatively, rather than scanning a plurality of rows at a time, all rows of the source program D1 can be scanned at a time.

In the execution program conversion explained above, it is explained that manipulation of the ID information or the version is performed every time each of the kinds of processing (the data type changing processing, the allocation destination memory address changing processing, the new addition processing, the deletion restoration processing, and the deletion processing) is executed. However, timing for the manipulation of the ID information or the version does not have to be every time each of these kinds of processing is executed.

For example, the label managing unit 23 can record, in a storage area of the storing unit 4 or the like, indication that the label managing unit 23 has executed each of these kinds of processing without manipulating the ID information and the version during the execution of each of these kinds of processing. Before ending the execution program conversion, the label managing unit 23 can execute the manipulation of the ID information or the version only once based on the content of the record. Specifically, when the label managing unit 23 executes the data type changing processing or the allocation destination memory address changing processing at least once in the single source program D1, the label managing unit 23 executes the update of the ID information and the initialization of the version only once. When the label managing unit 23 executes the new addition processing, the deletion restoration processing, or the deletion processing at least once without executing the data type changing processing and the allocation destination memory address changing processing, the label managing unit 23 executes the increment of the version only once.

It is explained that the ID information is updated only when the data type changing processing or the allocation destination memory address changing processing is performed. However, the ID information can be updated when arbitrary one or two of the new addition processing, the deletion restoration processing, and the deletion processing are performed in addition to the data type changing processing or the allocation destination memory address changing processing.

Figure 11:
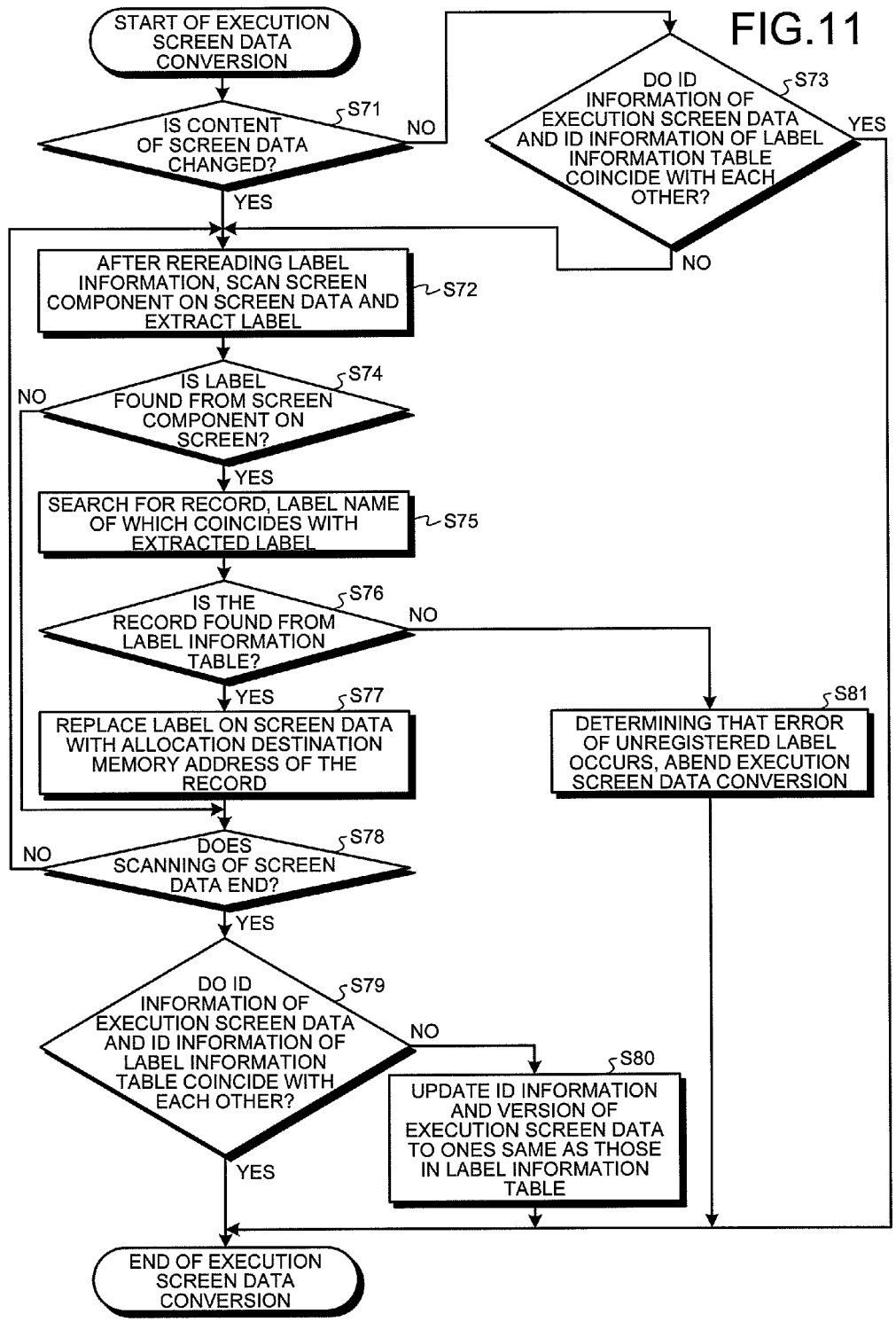
FIG. 11 is a flowchart for explaining execution screen data conversion.

FIG. 11 is a flowchart for explaining the operation of the drawing apparatus 3 for converting the screen data D4 into the execution screen data D5 (execution screen data conversion). As shown in the figure, first, the execution-screen-data converting unit 32 determines whether the content of the screen data D4 has been changed after the execution screen data conversion was executed last (step S71). When the content of the screen data D4 has been changed (Yes at step S71), the label reference unit 33 reads out the label information table D3 and scans one screen component on the screen data to extract a label (step S72). When the content of the screen data D4 has not been changed after the execution screen data conversion is executed last at step S71 (No at step S71), the label reference unit 33 determines whether the ID information of the execution screen data D5 and the ID information of the label information table D3 coincide with each other (step S73). When the kinds of ID information do not coincide with each other (No at step S73), the processing shifts to step S72. When the both kinds of ID information coincide with each other (Yes at step S73), the execution screen data conversion ends.

Following step S72, the label reference unit 33 determines whether a label has been found from the screen component (step S74). When a label is not found (No at step S74), the processing shifts to step S78 explained later. When a label is found (Yes at step S74), the label reference unit 33 searches for a record, the label name of which coincides with the label found from the screen component, in the label information table D3 (step S75). The label reference unit 33 determines whether the relevant record has been found from the label information table D3 by the search at step S75 (step S76). When the relevant record is found (Yes at step S76), the execution-screen-data converting unit 32 replaces the label on the screen data D4 with an allocation destination memory address of the found record (step S77). The label reference unit 33 then determines whether scanning of all screen component of the screen data D4 ends (step S78). If the scanning has not ended (No at step S78), the processing shifts to step S72 and the label reference unit 33 continues the scanning.

When the scanning of all the screen components of the screen data D4 ends (Yes at step S78), the label reference unit 33 determines again whether the ID information of the execution screen data D5 and the ID information of the label information table D3 coincide with each other (step S79). When these kinds of ID information coincide with each other (Yes at step S79), the execution screen data conversion ends.

When the ID information of the execution screen data D5 and the ID information of the label information table D3 do not coincide with each other (No at step S79), the label reference unit 33 updates the ID information and the version of the execution screen data D5 to the ones same as those of the label information table D3 (step S80) and the execution screen data conversion ends.

When the relevant record is not found at step S76 (No at step S76), the label reference unit 33 regards that a label is not registered (unregistered) and causes the execution screen data conversion to end (step S81) and the execution screen data conversion ends.

In the execution screen data conversion explained above, the screen components included in the screen data D4 are scanned one by one. However, a plurality of the screen components can be scanned at a time. When a plurality of labels are found from the scanned screen components, the processing at steps S75 to S77 or steps S75, S76, and S81 can be executed on each of the found labels. All the screen components included in the screen data D4 can be scanned at a time.

FIG. 12 is a flowchart for explaining ID collation processing executed by the display 6. When the display 6 is connected to the PLC 5, the screen control unit 64 acquires the ID information of the execution program D2 stored in the memory 52 of the PLC 5 via the communication unit 61 (step S91). The screen control unit 64 acquires the ID information of the execution screen data D5 stored in the memory 62 (step S92). The label-collation processing unit 65 determines whether the acquired ID information of the execution program D2 and the acquired ID information of the execution screen data D5 coincide with each other (step S93).

When these kinds of ID information coincide with each other at step S93 (Yes at step S93), the ID collation processing ends. In other words, the display 6 starts normal operation. When the both kinds of ID information do not coincide with each other (No at step S93), the label-collation processing unit 65 instructs the screen control unit 64 to execute abnormality processing. Specifically, the label-collation processing unit 65 outputs a message indicating that rereading of a screen (reconversion and re-download of the execution screen data D5) is necessary to the display screen 63 via the screen control unit 64 (step S94) and instructs the screen control unit 64 to prohibit the operation of the display screen 63 (step S95), and the ID collation processing ends.

As explained above, according to the embodiment of the present invention, the label managing unit 23 configured to update, when the execution program D2 is regenerated, the label information table D3 corresponding to the execution program D2 and execute or not execute, according to update content of the label information table D3, update of ID information given to the execution program D2 and the label information table D3. Therefore, the display 6 does not have to execute re-download of the execution screen data D5 every time the execution program D2 is regenerated. Therefore, the user can perform efficient program development.

The label managing unit 23 is configured to give version information to the execution program D2 and the label information table D3 and increment (update) the version information when update content of the label information table D3 is an increase or decrease of records. Therefore, even when the ID information is not updated, by checking the version information of the execution program D2 or the label information table D3, the user can recognize that the execution program D2 and the label information table D3 have been updated.

The label information table D3 includes the deletion flag indicating effective or ineffective for each of the records. The label managing unit 23 is configured to delete or restore the record by manipulating the deletion flag when the label information table D3 is to be updated. Therefore, when a once-deleted record is restored, the processing for allocating a memory address anew does not have to be executed.

The drawing apparatus 3 is configured to compare, after the execution program D2 is regenerated, the ID information given to the regenerated execution program D2 and the ID information given to the execution screen data D5 and, when these kinds of ID information are different, regenerate the execution screen data D5. Therefore, it is possible to reduce the frequency of regeneration of the execution screen data D5. Therefore, the user can perform efficient program development.

INDUSTRIAL APPLICABILITY

As explained above, the PLC system and the development system according to the present invention are suitably applied to a PLC system and a development system for controlling industrial equipments.

REFERENCE SIGNS LIST

1 DEVELOPMENT SYSTEM
2 PROGRAMMING APPARATUS
3 DRAWING APPARATUS
4 STORING UNIT
5 PROGRAMMABLE CONTROLLER
6 PROGRAMMABLE DISPLAY
21 EDITING-INPUT RECEIVING UNIT
22 EXECUTION-PROGRAM CONVERTING UNIT
23 LABEL MANAGING UNIT
24 COMMUNICATION UNIT
31 EDITING-INPUT RECEIVING UNIT
32 EXECUTION-SCREEN-DATA CONVERTING UNIT
33 LABEL REFERENCE UNIT
34 COMMUNICATION UNIT
51 COMMUNICATION UNIT
52 MEMORY
53 PROGRAM EXECUTING UNIT
61 COMMUNICATION UNIT
62 MEMORY
63 DISPLAY SCREEN
64 SCREEN CONTROL UNIT
65 LABEL-COLLATION PROCESSING UNIT
71 CPU
72 ROM
73 RAM
74 INPUT UNIT
75 DISPLAY UNIT
76 COMMUNICATION UNIT
77 EXTERNAL STORAGE INTERFACE
78 EXTERNAL STORAGE
81 PROGRAMMING PROGRAM
82 DRAWING PROGRAM
100 PLC SYSTEM

The invention claimed is:

1. A programmable controller system comprising:
a programmable controller (PLC) including a first memory that stores, in association with first identification information, a first program, in which a device address is used, for controlling external equipments, the programmable controller executing the first program;
a display including a second memory that stores first screen data, in which a device address is used, in association with second identification information; and
a development system including a program converting unit configured to generate the first program, which the first memory is caused to store, by allocating a device address to a label used in a second program in which the label is used instead of the device address, a label managing unit configured to generate label information, which is association for each label between the label used in the second program and the device address allocated to the label, when the program converting unit generates the first program, a label-information storing unit configured to store the label information, which is generated by the label managing unit, in association with the first identification information, and a drawing unit configured to generate the first screen data, which the second memory is caused to store, by converting the label used in the second screen data, in which the label is used instead of a device address, into the device address based on the label information stored by the label-information storing unit, and associate a value same as the first identification information, which has been associated with the label information at a point when the first screen data was generated, with the generated first screen data as the second identification information, wherein
when the program converting unit regenerates the first program, the label managing unit updates the label information stored by the label-information storing unit to correspond to the regeneration of the first program and executes excluding a case in which update content of the label information corresponds to the predetermined type, update of the first identification information associated with the label information and the regenerated first program, and
the display determines whether the first identification information associated with the first program executed by the PLC and the second identification information associated with the first screen data stored by the second memory coincide with each other, when these kinds of identification information coincide with each other, acquires, based on the first screen data stored by the second memory, content of the device address from the PLC and displays the content, and, when these kinds of identification information do not coincide with each other, executes abnormality processing.

2. The programmable controller system according to claim 1, wherein a predetermined type of update content of the label information is addition, deletion, or restoration of the deletion of association for each label included in the label information.

3. The programmable controller system according to claim 1, wherein the label managing unit updates the first identification information when the update content of the label information is a change of the device address at an allocation destination.

4. The programmable controller system according to claim 1, wherein
a data type of device data stored in the first memory is described for each label in the second program and the label information, and
the label managing unit updates the first identification information when the update content of the label information is a change of the data type.

5. The programmable controller system according to claim 1, wherein the label managing unit gives version information to the first program and the label information together with the first identification information and, when the update content of the label information corresponds to the predetermined type, updates the version information.

6. The programmable controller system according to claim 1, wherein
the label information includes, for each association included in the label information, a deletion flag indicating effective or ineffective, and
the label managing unit deletes or restores the association included in the label information by manipulating the deletion flag.

7. The programmable controller system according to claim 1, wherein the drawing unit compares, after the program converting unit regenerates the first program, the first identification information associated with the regenerated first program and the second identification information associated with the first screen data and, when these kinds of identification information are different, regenerates the first screen data.

8. A development system that creates: a first program downloaded to a programmable controller (PLC) which includes a first memory that stores, in association with first identification information, the first program, in which a device address is used, for controlling external equipments, the programmable controller executing the first program; and first screen data downloaded to a display which includes a second memory that stores first screen data in which a device address is used, in association with second identification information, and is configured to determine whether the first identification information associated with the first program executed by the PLC and the second identification information associated with the first screen data stored by the second memory coincide with each other, when these kinds of identification information coincide with each other, acquire, based on the first screen data stored by the second memory, content of the device address from the PLC and display the content, and, when these kinds of identification information do not coincide with each other, execute abnormality processing, the development system comprising:

a program converting unit configured to generate the first program, which the first memory is caused to store, by allocating a device address to a label used in a second program in which the label is used instead of the device address;

a label managing unit configured to generate label information, which is association for each label between the label used in the second program and the device address allocated to the label, when the program converting unit generates the first program;

a label-information storing unit configured to store the label information, which is generated by the label managing unit, in association with the first identification information; and a drawing unit configured to generate the first screen data, which the second memory is caused to store, by converting the label used in the second screen data, in which the label is used instead of a device address, into the device address based on the label information stored by the label-information storing unit, and associate a value same as the first identification information, which has been associated with the label information at a point when the first screen data was generated, with the generated first screen data as the second identification information, wherein when the program converting unit regenerates the first program, the label managing unit updates the label information stored by the label-information storing unit to correspond to the regeneration of the first program, and executes, excluding a case in which update content of the label information corresponds to the predetermined type, update of the first identification information associated with the label information and the regenerated first program.

9. The development system according to claim 8, wherein a predetermined type of update content of the label information is addition, deletion, or restoration of the deletion of association for each label included in the label information.

10. The development system according to claim 8, wherein the label managing unit updates the first identification information when the update content of the label information is a change of the device address at an allocation destination.

11. The development system according to claim 8, wherein
a data type of device data stored in the first memory is described for each label in the second program and the label information, and
the label managing unit updates the first identification information when the update content of the label information is a change of the data type.

12. The development system according to claim 8, wherein the drawing unit compares, after the program conversing unit regenerates the first program, the first identification information associated with the regenerated first program and the second identification information associated with the first screen data and, when these kinds of identification information are different, regenerates the first screen data.

13. The development system according to claim 9, wherein the label managing unit gives version information to the first program and the label information together with the first identification information and, when the update content of the label information corresponds to the predetermined type, updates the version information.

14. The development system according to claim 9, wherein
the label information includes, for each association included in the label information, a deletion flag indicating effective or ineffective, and
the label managing unit deletes or restores the association included in the label information by manipulating the deletion flag.

* * * * *